Figure 1:
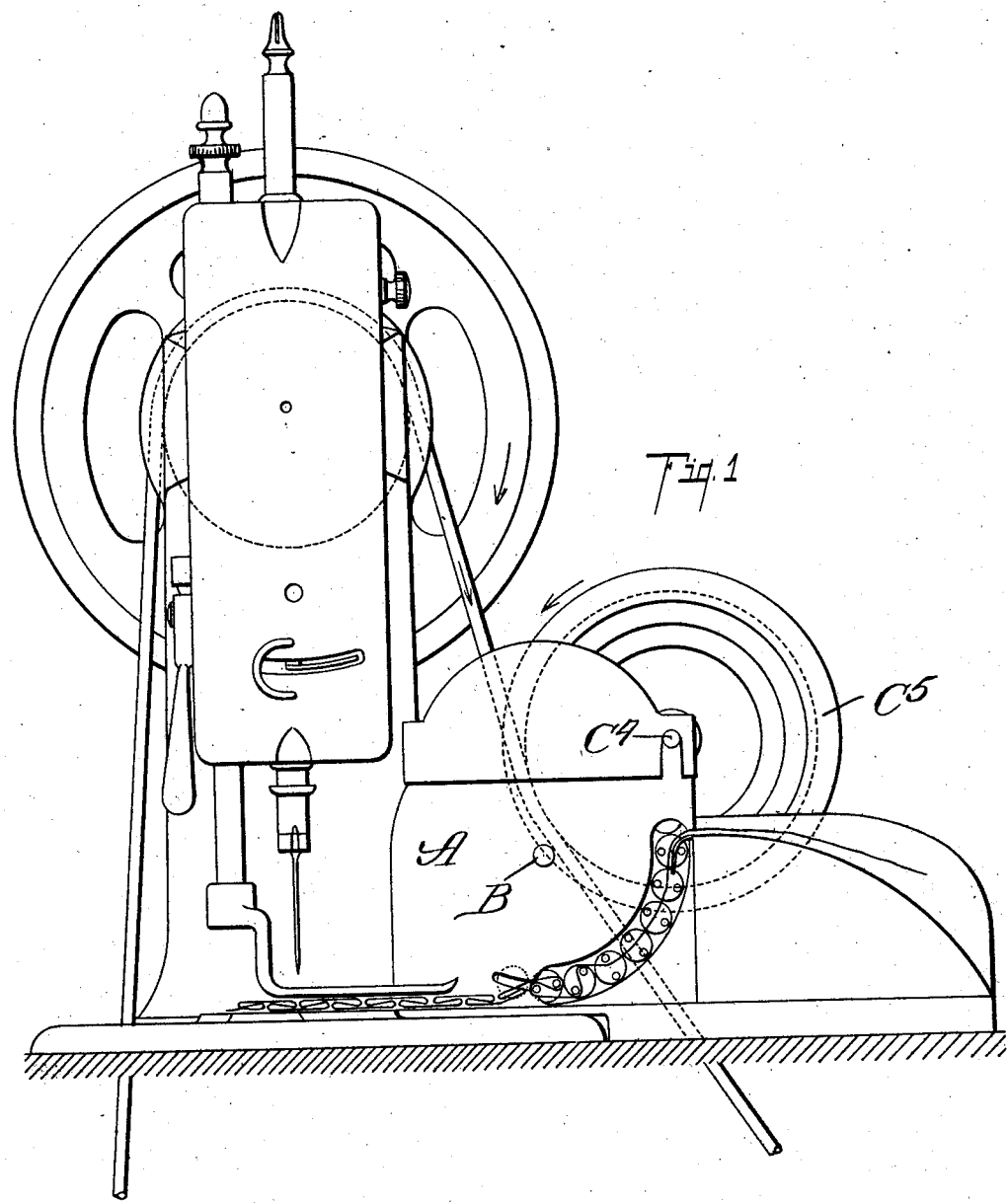

J. J. TEMPLE.
PLAITING DEVICE.
APPLICATION FILED JUNE 7, 1909.

1,022,802.

Patented Apr. 9, 1912.
4 SHEETS—SHEET 1.

Witnesses:
William T. Jones
Ralph Schaefer

Inventor:
John J. Temple,
By Dyrenforth, Lee, Chritton & Wiles,
Att'ys.

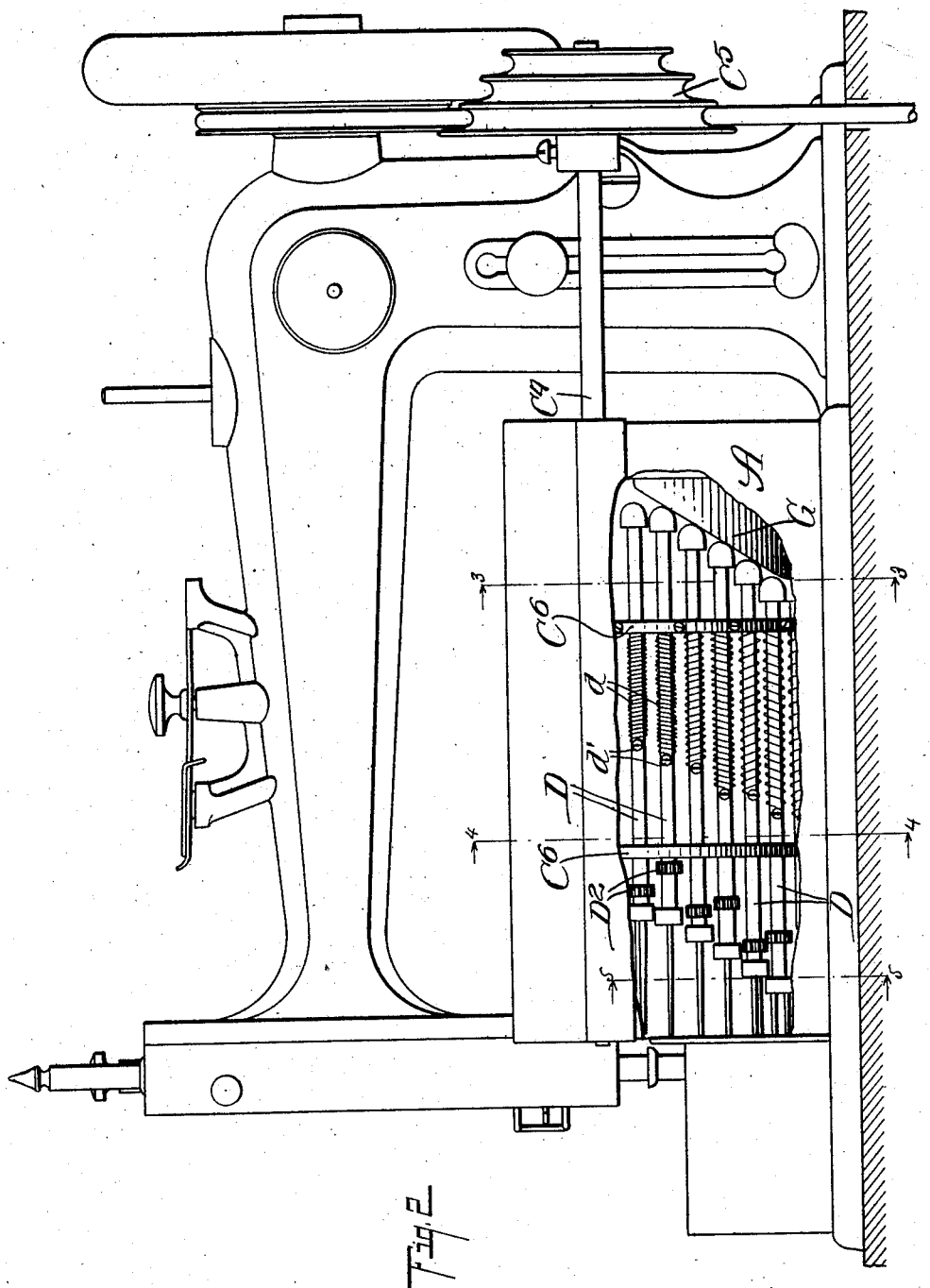

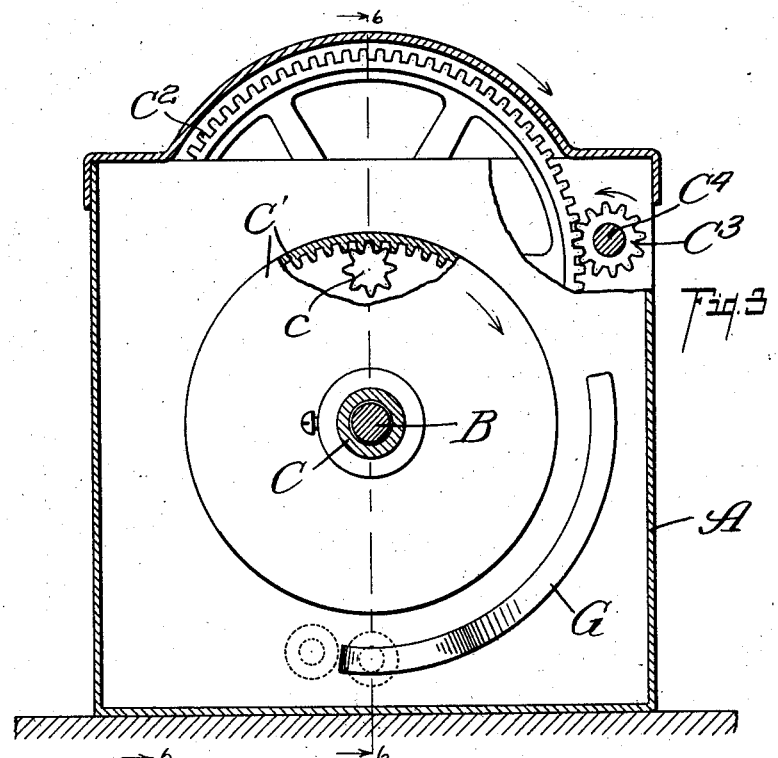
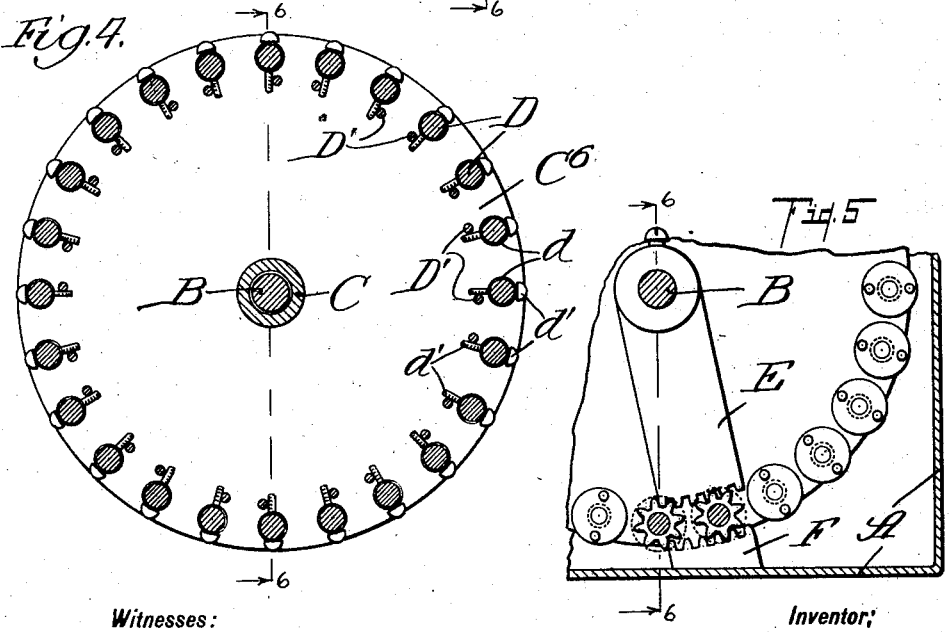

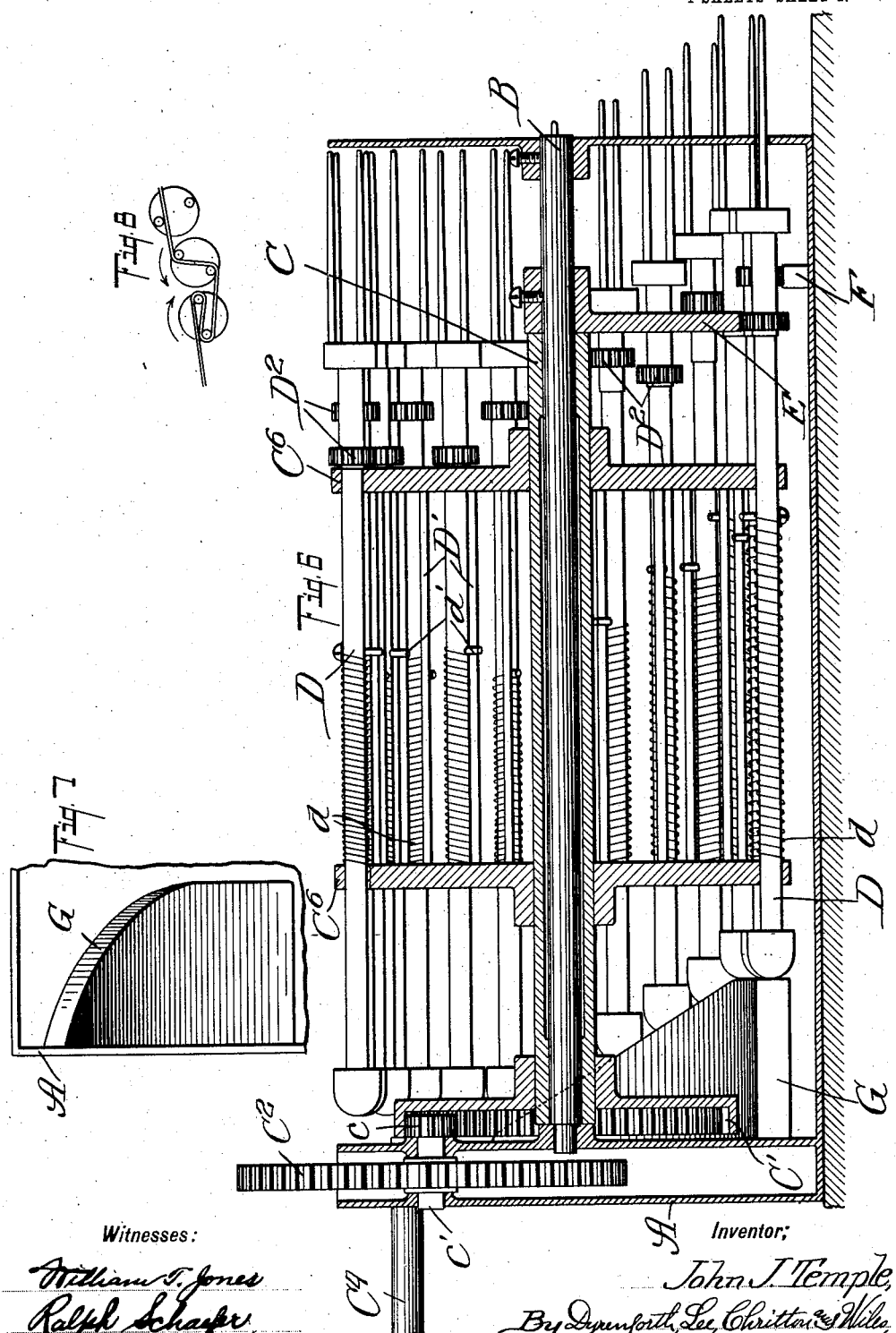

# UNITED STATES PATENT OFFICE.

JOHN J. TEMPLE, OF KALAMAZOO, MICHIGAN.

PLAITING DEVICE.

1,022,802.  Specification of Letters Patent.  Patented Apr. 9, 1912.

Application filed June 7, 1909. Serial No. 500,714.

*To all whom it may concern:*

Be it known that I, JOHN J. TEMPLE, a citizen of the United States, residing at Kalamazoo, in the county of Kalamazoo and State of Michigan, have invented a new and useful Improvement in Plaiting Devices, of which the following is a specification.

My invention relates to certain new and useful improvements in plaiting devices, and is fully described and explained in the specification and shown in the accompanying drawings, in which:

Figure 1 is an end view of my device, showing the same in its relation to a sewing-machine; Fig. 2 is a front elevation of the device with a part of the frame broken away to show the interior construction; Fig. 3 is a section on the line 3—3 of Fig. 2, looking in the direction of the arrow; Fig. 4 is a section in the line 4 of Fig. 2, looking in the direction of the arrow, but showing certain of the parts only; Fig. 5 is a fragmental section on the line 5—5 of Fig. 2, looking in the direction of the arrow; Fig. 6 is a longitudinal section on the line 6—6 of Fig. 4, looking in the direction of the arrow, the view being from the rear as shown in Fig. 2; Fig. 7 is an elevation of the cam looking downward thereon, and Fig. 8 is an end view of some of the plaiting forks showing the manner of their rotation and operation.

Referring to the drawings:—A is a frame made in the form of a hollow metal box which, in practice, is placed immediately in front of the operative head of the sewing-machine although, as will presently be explained, the sewing-machine might be dispensed with, other devices taking its place, although the sewing-machine is the preferred method of fixing the plaits. Extending longitudinally of the frame is a stationary non-rotating shaft B, upon which is mounted a rotatable sleeve C, to one end of which is secured an internal gear $C^1$ meshing with a pinion $c$ upon a shaft $c^1$, which in turn bears a large gear $C^2$. The gear $C^2$ in turn meshes with a pinion $C^3$ on a shaft $C^4$, which extends from the end of the box-like frame A and carries a pulley $C^5$ suitable for engagement with the belt of the sewing machine. The direction of rotation of the various parts is graphically represented by arrows appearing on Figs. 1 and 3. The sleeve C has rigidly attached to it two plates $C^6$, $C^6$, which support longitudinally movable rods D, each of which is also capable of a limited oscillatory movement of rotation about its own axis. Each of the rods D is surrounded by a spring $d$ which tends to hold it toward that end of the plaiter which is adjacent to the operative-mechanism of the sewing-machine head, that is toward the end which is at the left in Fig. 2, and at the right in Fig. 6.

It will be noted that the rods D are even in number, and that the alternate rods have their springs wound about them in opposite directions, so that each spring will tend to impart to its rod a movement of rotation opposite in direction to that of the adjacent rods on the two sides. Stop-rods $D^1$ (Fig. 6), extend between the two plates $C^6$, $C^6$, just inside the rods D, as shown in Fig. 4, and each of the rods D has a stop-pin $d^1$ extending transversely through it (Figs. 4 and 6), the stop-pins in adjacent rods lying on opposite sides of the corresponding rods. As shown in Fig. 4, the relation of the rods being such that each spring will tend to rotate its rod in the proper direction until the stop-pin strikes the corresponding stop-rod, whereupon the rod will be held against further rotation by the pressure of the spring.

The stationary shaft B carries an external segmental pinion E, and an internal segmental pinion F is mounted in the frame A in a staggered relation with reference to the segmental pinion E. Each of the rods D carries a pinion $D^2$, the pinions $D^2$ upon the adjacent rods being staggered with reference to each other, so that when the rods are in their most advanced position longitudinally, the pinions on one rod will strike the segmental-pinion E, while the pinion on the next rod will strike the pinion F, and so on. By this means, as the sleeve is rotated through the gear-mechanism described, carrying with it the plates and rods D, the rods will not rotate with reference to the plates until they reach nearly their lowest point in their movement of revolution about the shaft B, whereupon they will be given the short movements of rotation about their own axis, each rod in an opposite direction to the last and following. It will be understood, of course, that the springs, stop-pins stop-rods are so arranged on the corresponding rods D as to permit this movement of rotation to take place against the action of the corresponding spring. Each of the rods D carries upon its end adjacent to the sewing-mechanism of the operative head of the machine, (the left-hand end in Fig. 2, and the right-hand end in Fig. 6) two pins which form together a fork, the position of these pins being such that when the rods are in their normal positions, a line connecting the pins would be radial with respect to the shaft B.

A cam G is mounted within the frame A, the same being so arranged as to engage with the opposite ends of the rods D from the ends which carry the forks (the right-hand end of the rods as viewed in Fig. 2, and the left-hand end as viewed in Fig. 6). This cam is so arranged that as the rods perform their movement of revolution about the shaft they will, when they reach the furthermost point of their movement in a forward direction, engage the cam and be moved forward against the influence of their springs as shown in Figs. 2 and 6. As the rods reach the lowest point in their course, they will reach an advanced dwell upon the cam (Fig. 6) and will remain in their forward position during the time when they are engaging the proper pinion and being rotated thereby. Immediately after this operation has taken place, the rods will run off the cam G, and be immediately drawn back to position and simultaneously be given by the springs a movement of rotation to bring them into their original positions.

The manner of operation of this mechanism upon cloth in the act of sewing or otherwise making box-plaits will readily be understood by reference to Figs. 1 and 8. The material is fed in as shown in Fig. 1, at that point where the rods are just beginning to be advanced and between the pins thereon. The material follows a path concentric with the movement of the rods lying between the forks thereon, until the bottom of the movement of the rods is reached, at which time each two adjacent rods suddenly rotate in opposite directions and their forks throw the box-plaits in the manner illustrated in the drawings. Immediately after the formation of the plaits in this way, the rods are freed from the action of the cam and are longitudinally retracted by means of the springs so as to free the material therefrom. This concludes the operation of the plaiting-device as such. In practice, as a normal operation, the material thrown into plaits will be fed through a sewing-machine in the ordinary way and the plaits thus secured in position. It is obvious, however, that while sewing the plaits is probably the most convenient manner of securing them in position, the essential part of this present invention is completed when the plaits are formed and any other method of permanently securing them in their folds would be equally within the spirit of my invention, as for instance, securing the plaits by the application of an adhesive strip.

I realize that considerable variation is possible in the details of construction of my improved device, without departing from the spirit of my invention, and I do not intend therefore, to limit myself to the specific form herein shown and described.

What I claim as new and desire to secure by Letters Patent is—

1. In a plaiter, a pair of forks which are adapted simultaneously to engage the material to be plaited, and means for rotating the forks in opposite directions to move the material oppositely upon itself.

2. In a plaiter, a pair of forks which are adapted simultaneously to engage the material to be plaited, means for rotating the forks in opposite directions to move the material oppositely upon itself, and means for withdrawing the forks from the fold thus made.

3. In a plaiter, a fork between the tines of which the material to be plaited may be placed, means for advancing the fork in the line of the feed, a gear connected to the fork, and a stationary gear with which said first-named gear may engage in its movement to rotate the fork to fold the material upon itself.

4. In a plaiter, a pair of forks which are adapted simultaneously to engage the material to be plaited, means for advancing the forks in the line of the feed and means for rotating the forks in opposite directions to fold the material oppositely upon itself.

5. In a plaiter, a pair of forks between the tines of which the material to be plaited may be placed, means for advancing the forks, gears connected to the forks, and stationary gears on opposite sides of the path of the forks with which the gears attached to the forks may respectively engage, whereby the forks may be rotated in opposite directions.

6. In a plaiter, a fork between the tines of which the material to be plaited may be placed, means for advancing the fork in the line of the feed, a gear connected to the fork, a stationary gear with which said first-named gear may engage, and means for withdrawing the fork longitudinally from the folds of the material made by its rotation.

7. In a plaiter, a pair of forks between the tines of which the material to be plaited may be placed, means for advancing the forks in the line of the feed, gears connected to the forks, stationary gears on opposite sides of the path of the forks with which the gears may engage respectively to rotate the forks in opposite directions, and means for withdrawing the forks longitudinally from the folds made by their rotation.

8. In a plaiter, a fork between the tines of which the material to be plaited may be placed, means for advancing the fork in the line of the feed, a gear connected to the fork, a stationary gear with which said first-named gear may engage as the fork is advanced, and means for withdrawing the fork longitudinally from the folds of the material.

9. In a plaiter, a fork between the tines of which the material to be plaited may be placed, means for revolving the fork in a circle about a center, and means for partially rotating the fork upon its own axis while in revolution.

10. In a plaiter, a fork between the tines of which the material to be plaited may be placed, means for revolving the fork in a circle about a center, a gear having connection with the fork and a stationary gear adapted to engage with said first-named gear to rotate the fork about its own axis.

11. In a plaiter, a pair of forks between the tines of which the material to be plaited may placed, means for revolving the pair of forks in a circular path about a center and means for rotating the forks upon their own axes.

12. In a plaiter, a pair of forks between the tines of which the material to be plaited may be placed, means for revolving the forks in a circular path about a center, gears attached to the forks and a stationary internal and a stationary external gear in position to engage respectively with said first-named gear to rotate the forks upon their own axes in opposite directions.

13. In a plaiter, a fork between the tines of which the material to be plaited may be placed, means for revolving the fork in a circular path about a center, means for rotating the fork upon its own axis while in revolution, and means for withdrawing the fork longitudinally from the material plaited.

14. In a plaiter, a fork between the tines of which the material to be plaited may be placed, means for revolving the fork in a circular path about a center, a gear connected to the fork, a stationary gear with which said first-named gear may engage, and means for withdrawing the fork longitudinally from the folds of the material made by its rotation.

15. In a plaiter, a pair of forks between the tines of which the material to be plaited may be placed, means for revolving the forks in a circular path about a center, gears connected with the forks, said gears being in a staggered relation to each other, a stationary internal gear and a stationary external gear with which the gears on the forks may respectively engage to rotate the forks in opposite directions, and means for withdrawing the forks longitudinally from the folds made by their rotations.

16. In a plaiter, a fork between the tines of which the material to be plaited may be placed, means for revolving the fork in a circular path about a center, a gear connected to the fork, a stationary gear with which said first-named gear may engage as the fork is revolved to rotate the fork on its own axis, and means for withdrawing the fork longitudinally from the folds of the material.

17. In a plaiter, a fork between the tines of which the material to be plaited may be placed, means for advancing the fork in the line of the feed, means for rotating the fork to fold the material upon itself, and a stationary cam operating to move the fork longitudinally.

18. In a plaiter, a fork between the tines of which the material to be plaited may be placed, means for advancing the fork in the line of the feed, a gear connected to the fork, a stationary gear with which said first-named gear may engage in its movement to rotate the fork to move the material upon itself, and a stationary cam for moving the fork longitudinally.

19. In a plaiter, a pair of forks between the tines of which the material to be plaited may be placed, means for advancing the forks in the line of the feed and means for rotating the forks in opposite directions to fold the material oppositely upon itself, and a stationary cam adapted to be engaged by the forks in their movement to propel them longitudinally.

20. In a plaiter, a pair of forks between the tines of which the material to be plaited may be placed, means for advancing the forks in the line of the feed, gears connected to the forks in a staggered relation to each other, stationary gears on opposite sides of the path of the forks with which the gears attached to the forks may respectively engage, and be rotated in opposite directions and a stationary cam for moving the forks longitudinally as they are advanced.

21. In a plaiter, a fork between the tines of which the material to be plaited may be placed, means for revolving the fork in a circle about a center, means for partially rotating the fork upon its own axis while in revolution, and a stationary cam adapted to be engaged by the fork in its revolution to move the same longitudinally.

22. In a plaiter, a fork between the tines of which the material to be plaited may be placed, means for revolving the fork in a circle about a center, a gear having connection with the fork and a stationary gear adapted to engage with said first-named gear to rotate the fork about its own axis, and a stationary cam adapted to advance the fork longitudinally.

23. In a plaiter, a pair of forks between the tines of which the material to be plaited may be placed, means for revolving the pair of forks in a circular path about a center, means for rotating the forks oppositely upon their own axes, and a stationary cam with which the forks may engage to be thereby advanced longitudinally.

24. In a plaiter, a pair of forks between the tines of which the material to be plaited may be placed, means for revolving the forks in a circular path about a center, gears attached to the forks in staggered relation with respect to each other, a stationary internal and stationary external gear in position to engage respectively with the first-named gears to rotate the forks in opposite directions, and a stationary cam adapted to be engaged by the forks as they are revolved to advance them longitudinally.

25. In a plaiter, a rotatable frame, a series of forks between the tines of which the material to be plaited may be placed, said forks being carried by said frame and revoluble therewith, and means for rotating the forks upon their own axes to fold the material into plaits.

26. In a plaiter, a rotatable frame, a series of forks between the tines of which the material to be plaited may be placed, said forks being carried by the frame and revoluble therewith, and means for rotating the adjacent forks in opposite directions to fold the material oppositely into plaits.

27. In a plaiter, a rotatable frame, a series of forks between the tines of which the material to be plaited may be placed, said forks being carried by the frame and revoluble therewith, means for rotating the forks upon their own axes to fold the material into plaits, and means for retracting the forks from the plaits thus formed.

28. In a plaiter, a rotatable frame, a series of forks between the tines of which the goods to be plaited may be placed, said forks being carried by said frame and revoluble therewith, means for rotating the adjacent forks in opposite directions, and means for retracting the forks.

29. In a plaiter, a rotatable frame, a series of forks between the tines of which the material to be plaited may be placed, said forks being carried by said frame and revoluble therewith, means for rotating the forks upon their own axes to fold the material into plaits, and a stationary cam for moving the forks longitudinally.

30. In a plaiter, a rotatable frame, a series of forks between the tines of which the material to be plaited may be placed, said forks being carried by said frame and revoluble therewith, means for rotating the adjacent forks in opposite directions, and a stationary cam adapted to engage said forks and move them longitudinally.

31. In a plaiter, a rotatable frame, a series of forks between the tines of which the material to be plaited may be placed, said forks being carried by said frame and revoluble therewith, gears attached to the forks and a stationary gear wherewith said gears may engage to rotate the forks upon their own axes.

32. In a plaiter, a rotatable frame, a series of forks between the tines of which the material to be plaited may be placed, said forks being carried by said frame and revoluble therewith, gears attached to said forks, and a stationary gear wherewith said gears may successively engage to rotate the forks.

33. In a plaiter, a rotatable frame, a series of forks between the tines of which the material to be plaited may be placed, said forks being carried by said frame and revoluble therewith, gears attached to the forks, the gears on the adjacent forks being in staggered relation to each other, and a stationary internal and a stationary external gear wherewith the gears on the forks may respectively engage to rotate the forks in opposite directions upon their own axes while in revolution.

34. In a plaiter, a rotatable frame, a series of forks between the tines of which the material to be plaited may be placed, said forks being carried by said frame and revoluble therewith, gears attached to said forks, and a cam adapted to engage the successive forks to move them longitudinally.

35. In a plaiter, a rotatable frame, a series of forks between the tines of which the material to be plaited may be placed, said forks being carried by said frame and revoluble therewith, gears attached to the forks, the gears on the adjacent forks being in staggered relation to each other, and a cam adapted to engage the successive forks to move them longitudinally.

JOHN J. TEMPLE.

In presence of—
R. D. McKinney,
F. E. Lemert.

---

Copies of this patent may be obtained for five cents each, by addressing the "Commissioner of Patents, Washington, D. C."